United States Patent
Kroencke et al.

(10) Patent No.: US 9,340,127 B2
(45) Date of Patent: May 17, 2016

(54) VEHICLE SEAT WITH BACKREST TILT SETTING AND SHOULDER ADJUSTMENT

(71) Applicant: ISRINGHAUSEN GmbH & Co. KG, Lemgo (DE)

(72) Inventors: Reiner Kroencke, Hohnhorst (DE); Winfried Titz, Detmold (DE); Reiner Lieker, Extertal (DE)

(73) Assignee: ISRINGHAUSEN GMBH & CO. KG, Lemgo (DE)

( * ) Notice: Subject to any disclaimer, the term of this patent is extended or adjusted under 35 U.S.C. 154(b) by 0 days.

(21) Appl. No.: 14/411,222

(22) PCT Filed: Jun. 28, 2013

(86) PCT No.: PCT/EP2013/001907
§ 371 (c)(1),
(2) Date: Dec. 24, 2014

(87) PCT Pub. No.: WO2014/000892
PCT Pub. Date: Jan. 3, 2014

(65) Prior Publication Data
US 2015/0191107 A1 Jul. 9, 2015

(30) Foreign Application Priority Data

Jun. 29, 2012 (DE) .......................... 10 2012 012983

(51) Int. Cl.
*B60N 2/22* (2006.01)
*B60N 2/23* (2006.01)
*B60N 2/44* (2006.01)

(52) U.S. Cl.
CPC .............. *B60N 2/2222* (2013.01); *B60N 2/224* (2013.01); *B60N 2/231* (2013.01); *B60N 2/4415* (2013.01)

(58) Field of Classification Search
CPC .... B60N 2/2222; B60N 2/4415; B60N 2/224; B60N 2/231; B60N 2/206; B60N 2/20; B60N 2/22; B60N 2/3011; B60N 2/305
USPC .................. 297/378.12, 378.1, 354.1, 361.1, 297/DIG. 3, 284.1, 383
See application file for complete search history.

(56) References Cited

U.S. PATENT DOCUMENTS 6,513,876 B1 * 2/2003 Agler et al. .............. 297/378.14
7,686,394 B2 3/2010 Nishikawa et al.
(Continued)

FOREIGN PATENT DOCUMENTS

DE    19754311 A1    12/1998
DE    19910666 A1    9/2000
(Continued)

OTHER PUBLICATIONS

PCT International Preliminary Report on Patentability and Written Opinion for PCT/EP2013/001907 (Jun. 28, 2013).
(Continued)

*Primary Examiner* — Milton Nelson, Jr.
(74) *Attorney, Agent, or Firm* — Abelman, Frayne & Schwab

(57) ABSTRACT

The invention relates to a vehicle seat with a seat part 1 and a backrest 2, wherein the angle formed between the seat part 1 and the backrest 2 can be set, wherein the backrest 2 consists of a backrest base 3 facing the seat part 1 and of a backrest upper part 4 adjoining the backrest base 3, wherein the backrest upper part 4 can be pivoted with respect to the backrest base 3 about a substantially horizontally aligned pivot axis 5, wherein the angular position of the backrest upper part 4 with respect to the backrest base 3 can be set with respect to the seat part 1 independently of the angular position of the backrest base 3, with a first locking device, by means of which the tilt of the backrest base 3 with respect to the seat part 1 can be fixed in at least two positions, wherein there is an operating lever 6 which operates the first locking device mechanically, with a second locking device 7, by means of which the tilt of the backrest upper part 4 with respect to the backrest base 3 can be fixed in at least two positions, wherein there is a switch 8 which operates the second locking device 7 and, for this, is in active connection with a pneumatic control element 9 and at least one pneumatic actuator element 10, wherein the switch 8 is integrated in the operating lever 6.

12 Claims, 5 Drawing Sheets

(56) References Cited

U.S. PATENT DOCUMENTS

Figure 1:
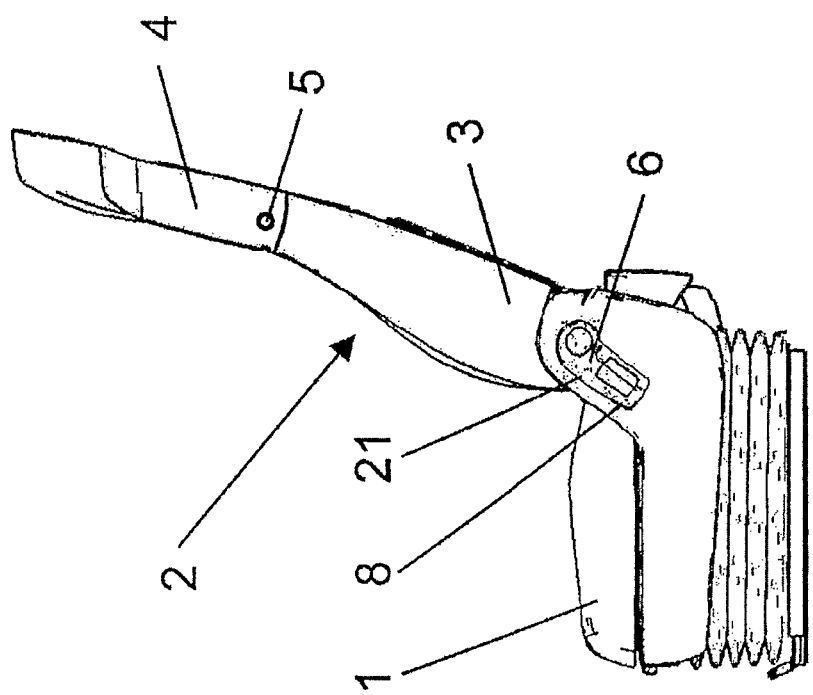

| | | | |
|---|---|---|---|
| 8,974,001 B2* | 3/2015 | Fahl et al. | 297/378.12 |
| 2005/0248200 A1* | 11/2005 | Pradier et al. | 297/378.1 |
| 2007/0102988 A1 | 5/2007 | Jeong | |
| 2008/0296950 A1 | 12/2008 | Wieclawski | |

FOREIGN PATENT DOCUMENTS

| | | |
|---|---|---|
| DE | 10238656 A1 | 8/2002 |
| DE | 10238656 A1 | 3/2004 |
| DE | 102004014420 A1 | 10/2005 |
| DE | 102004060816 A1 | 6/2006 |
| DE | 102006059540 A1 | 7/2008 |
| DE | 102007004767 A1 | 8/2008 |
| DE | 102007034462 B4 | 2/2009 |
| EP | 1391344 A2 | 2/2002 |
| EP | 1159152 B1 | 11/2005 |
| EP | 1932715 B1 | 12/2009 |
| FR | 001598812 A * | 7/1970 |
| JP | 6072218 A | 3/1994 |
| WO | 01/56830 A1 | 8/2001 |
| WO | 2008/029952 A2 | 3/2008 |
| WO | 2008092556 | 8/2008 |

OTHER PUBLICATIONS

Chinese Search Report dated Jan. 5, 2016 issued by the State Intellectual Property Office of the People's Republic of China (SIPO) with English translation.

* cited by examiner

VEHICLE SEAT WITH BACKREST TILT SETTING AND SHOULDER ADJUSTMENT

The invention relates to a vehicle seat with a seat part and a backrest, wherein the angle formed between the seat part and the backrest can be set, wherein the backrest consists of a backrest base facing the seat part and of a backrest upper part adjoining the backrest base, wherein the backrest upper part can be pivoted with respect to the backrest base about a substantially horizontally aligned pivot axis, wherein the angular position of the backrest upper part with respect to the backrest base can be set with respect to the seat part independently of the angular position of the backrest base.

Vehicle seats are known which, in particular in the commercial vehicle sector, are equipped with various setting possibilities in order to offer sufficient comfort and satisfactory ergonomics. These setting possibilities include for example seat-height setting, seat-base tilt setting, backrest tilt setting and shoulder adjustment. In the case of a shoulder adjustment, the backrest is divided into a backrest base and a backrest upper part. The backrest base here is connected to a seat part of the vehicle seat around a rotational axis at its lower end, wherein there is a first locking device between these two parts, in order to be able to set the tilt of the backrest with respect to the seat part. At the upper end of the backrest base, the latter is connected to the lower part of the backrest upper part so as to be pivotable via a pivot axis. These two parts can be fixed in different angular positions relative to each other via a second locking device. The pivot axis between the backrest upper part and the backrest base runs substantially horizontally and thus parallel to the rotational axis between the backrest base and the seat part. A very good adjustment of the seat interfaces to the size, weight and desire for comfort of a seat user is guaranteed by the two setting possibilities for the backrest tilt and the shoulder adjustment.

Two operating elements are needed to operate the two above-named setting possibilities. The operating element for setting the backrest tilt is routinely located directly on the rotational axis between the seat part and the backrest base and is formed as a mechanical mechanism. For example, a rotary knob is operated which acts directly on a self-locking toothing between the seat part and the backrest base. Alternatively, an operating lever is also known which is pivoted against a force to be applied by the seat user and disengages the toothing between the seat part and the back rest base, with the result that the tilt between these two parts can be set by the seat user; when the desired tilt is achieved, the user releases the operating lever, with the result that the two toothing elements engage again.

The setting of the shoulder adjustment is routinely likewise achieved by a mechanical mechanism. Between the backrest base and the backrest upper part, a toothing serves to fix the angle between these two parts. This toothing can be disengaged by means of an operating element, comparably to the setting of the backrest tilt already described above. After the desired angle has been set, the operating element is released again and the shoulder adjustment catches in the desired position. The operating element for the shoulder adjustment is located for example spatially close to the operating element for setting the backrest tilt, which involves a more elaborate mechanical system than a positioning of the operating element directly next to the pivot axis between the backrest base and the backrest upper part, in order to be able to effect the remote action on the toothing lying at a distance. In the case of a positioning of the operating element close to the pivot axis, on the other hand, a simple mechanical system can be used.

A disadvantage in the above-described embodiments of the two setting devices and their possible positions is that they require a not insignificant installation space.

The object of the invention is therefore to provide an angle-adjustable backrest with a shoulder adjustment adjustable independently thereof, in which the two operating elements including the associated setting devices need less installation space and yet are arranged ergonomically sensibly.

This object is achieved by a vehicle seat with the features of claim 1. Because the switch which operates the second locking device for fixing the angle of the shoulder adjustment between the backrest upper part and the backrest base is integrated in the operating lever, a space-saving device is achieved. As the switch operates a pneumatic actuator element via a pneumatic control element, the shoulder adjustment can be operated by an extremely small exertion of force. The pressure on the switch has the effect that the second locking device between the backrest upper part and the backrest base can be disengaged by means of auxiliary power, whereby much less force needs to be exerted than in the case of a mechanical operation.

An advantageous development of the invention provides that the switch is formed as a rocker rotatable with respect to the operating lever about a rotational axis. Such an embodiment offers the possibility of integrating the switch very well and at an ergonomically sensible position in the operating lever and in addition also of facilitating at the same time an ergonomically good operation of the switch.

A further advantageous development of the invention provides that the at least one pneumatic actuator element is a single-acting pneumatic cylinder which is arranged on the backrest base. By means of such a pneumatic cylinder, a simple setting of the shoulder adjustment can be achieved via the remote-controlled locking device operated by auxiliary power.

A further advantageous development of the invention provides that the pneumatic control element and the at least one pneumatic actuator element are supplied with pneumatic energy by an on-board air compressor or an electrically operated miniature compressor. These are very simple possibilities for providing the auxiliary power for operating the shoulder adjustment.

A further advantageous development of the invention provides that the at least one pressurized pneumatic actuator element brings a respectively allocated catch, which is a component of the second locking device, into an unlocked position and, when the at least one pneumatic actuator element is depressurized, the respectively allocated catch is brought into a locked position in a spring-loaded manner. A reliable setting of the shoulder adjustment is thereby achieved by a simple mechanical system on which the pneumatic actuator element acts.

A further advantageous development of the invention provides that the adjustment range of the backrest upper part with respect to the backrest base is between 0° and 20°, preferably between 14° and 20°. This is the angle range of the shoulder adjustment which is the most favourable ergonomically for the majority of potential seat users. A further advantageous development of the invention provides that the step size of the angle setting of the backrest upper part with respect to the backrest base and/or the step size of the angle setting of the backrest base with respect to the seat part is in each case between 1.5° and 2.5°. These step sizes form, on the one hand, a subdivision of the setting possibilities that is still adequate in respect of comfort and, on the other hand, a setting possibility that can be represented with sensible mechanical means and does not have too many small parts, which would lead to much more complex mechanical systems.

A further advantageous development of the invention provides that one catch each is arranged on each side of the backrest for fixing the angular position of the backrest upper part relative to the backrest base. Through the simultaneous use of catches on each side of the backrests, these can be designed such that they need to withstand smaller mechanical loads than if a catch were formed only on one of the sides of the backrest.

A further advantageous development of the invention provides that if pneumatic auxiliary power is not available the tilt of the backrest upper part with respect to the backrest base can be locked or unlocked by means of a mechanical mechanism by manual actuation. Even if the pneumatic connection is broken it is thereby ensured that the seat user can still always set the shoulder adjustment according to his needs.

A further advantageous development of the invention provides that the pneumatic control element is designed as a 3/2-way valve. This represents a particularly simple possibility for using the pneumatic auxiliary power to set the shoulder adjustment.

Figure 2:
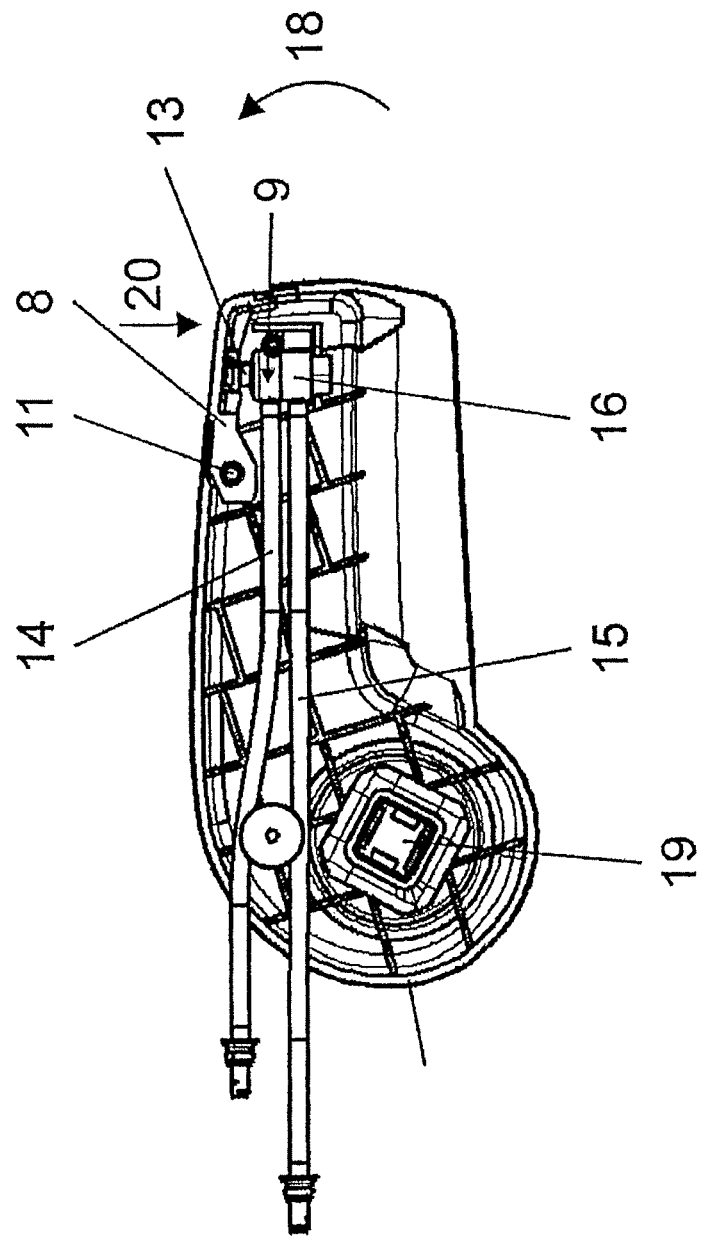
Figure 3:
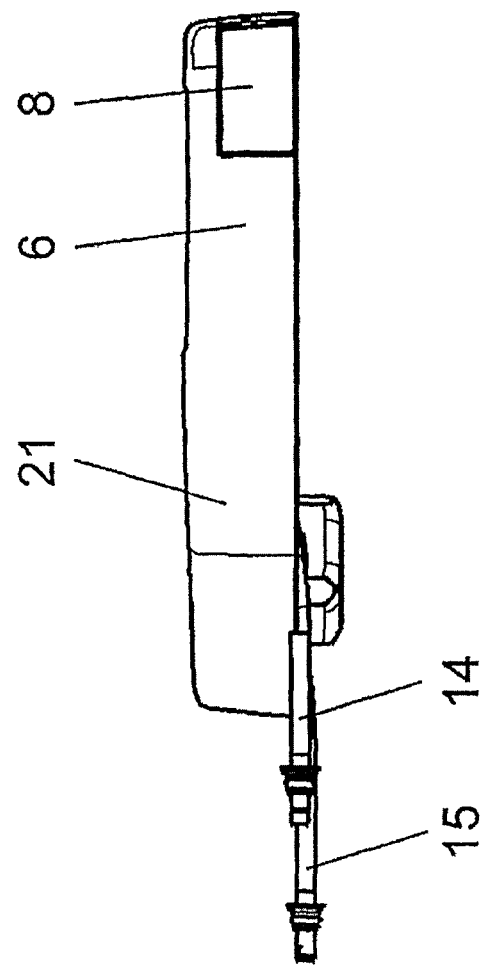
Figure 4:
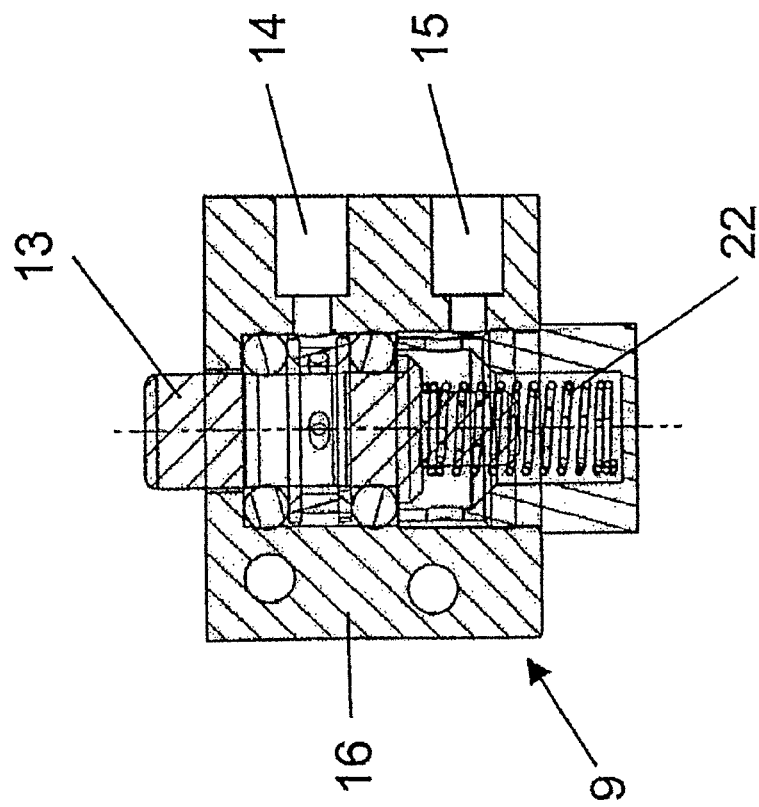
Figure 5:
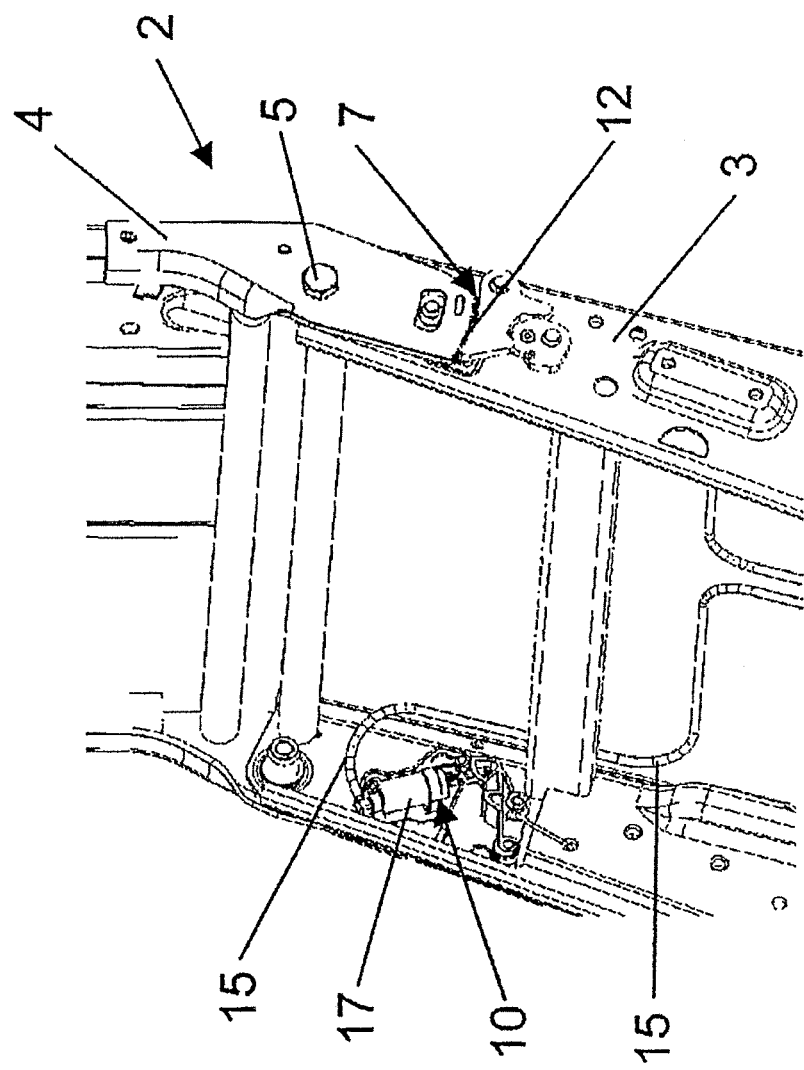

Further advantages and details of the invention are explained with reference to the embodiment example represented in the figures. The figures show in detail:

FIG. 1 a view of a vehicle seat with the components relevant to the invention,

FIG. 2 a side view of an operating lever according to the invention with integrated switch, FIG. 3 the view of the integrated operating lever with switch of FIG. 2 seen from above, FIG. 4 an enlarged longitudinal section through a pneumatic control element according to FIG. 2 and FIG. 5 an enlarged view of the range of the shoulder adjustment from FIG. 1.

A vehicle seat which shows the elements essential for the invention is represented in FIG. 1. In its lower area, a seat part 1 extends substantially horizontally. At the back end of the seat part 1, the latter is connected to a backrest 2 via a rotational axis which runs substantially horizontally. The backrest 2 is divided into two parts arranged one above the other vertically: in the lower area, a backrest base 3 is represented which, at its upper end, is connected to the lower end of a backrest upper part 4 so as to be pivotable about a pivot axis 5 which likewise runs substantially horizontally. The area in which the two parts of the backrest 2 are connected to each other is represented enlarged in FIG. 5. The features essential to the invention represented there are discussed further below.

In the area of the rotational axis where seat part 1 and backrest base 3 are connected to each other rotatably, there is an operating lever 6. This operating lever, which is described in more detail further below with reference to FIGS. 2 and 3—where it is represented enlarged—serves to facilitate a setting of the tilt between the backrest base 3 and the seat part 1. At the same time, by a switch 8 integrated in this, the shoulder adjustment between the backrest base 3 and the backrest upper part 4 can also be set.

FIG. 2 shows a representation of the operating lever 6 according to the invention from the direction in which it is in contact with the seat part 1. This means that its cover 21, which is to be seen in FIGS. 1 and 3, is formed on the side facing away from the direction of view. The operating lever 6 acts, via an operating flange 19, on a mechanical system (not represented) which acts on a first locking device (not represented) which can disengage a toothing (not represented) between the seat part 1 and the backrest base 3. For this, there is a mechanical connection (not represented) between the operating flange 19 and the toothing. As the operating lever 6 is directly next to the rotational axis between the seat part 1 and the backrest base 3 and the first locking device in connection with it, only an extremely simple mechanical system is needed in order to be able to carry out the setting of the seat rest tilt.

As such a setting device is well known to a person skilled in the art, it is discussed only briefly: if the operating lever 6 is pulled upwards in the direction of the unlocking direction 18, the first locking device is moved to such an extent that the toothings which are formed on the seat part 1 and on the backrest base 3 are disengaged against a spring. As long as the operating lever 6 is held upwards in the unlocking direction 18, the seat user can alter the tilt of the backrest 2 with respect to the seat part 1 in a known manner. When he has achieved the most favourable tilt angle for him, he releases the operating lever 6, with the result that the latter moves downwards again against the unlocking direction 18 (routinely by a spring device known to a person skilled in the art), with the result that a positive locking between the toothings on the seat part 1 and on the backrest base 3 takes place again via the mechanical system (for example by means of an elastic force). A secure catching of the backrest base 3 with respect to the seat part 1 is thus guaranteed in the angle setting desired by the seat user.

However, the operating lever 6 gives the seat user not only a setting possibility for the backrest tilt, but also for the shoulder adjustment—angle between the backrest upper part 4 and the backrest base 3. For this, a switch 8 is integrated in the operating lever 6, in the front area of the operating lever 6. The switch 8 is movable with respect to the operating lever 6 around a rotational axis 11 running substantially horizontally. The switch 8 is operated by a pressure in the pressure direction 20, i.e. substantially vertically from top to bottom onto the switch 8. The latter then moves downwards in the manner of a rocker around the rotational axis 11 in its right-hand area. A pneumatic control element 9 is arranged below the switch 8. The described movement of the switch 8 downwards in the pressure direction 20 effects the pneumatic unlocking, described in more detail below, of a second locking device 7 between the backrest base 3 and the backrest upper part 4 (see FIG. 5).

In order to be able to operate the pneumatic actuation of the second locking device 7 for setting the shoulder adjustment, the pneumatic control element 9 is formed as a 3/2-way valve 16. A section through this 3/2-way valve 16 is represented in FIG. 4. In the following, the description of the pneumatics on the part of the operating lever 6 is given with reference to FIGS. 2 and 4. A ram 13 is pressed upwards by a spring 22, with the result that the 3/2-way valve is located, in the unloaded state, in its blocked position. This means that pressurized air, which enters the 3/2-way valve 16 at the top via a supply line 14, cannot reach through this valve into the actuator line 15 formed at the bottom on the 3/2-way valve 16.

If the ram 13 is pressed downwards into the 3/2-way valve 16 against the elastic force by pressure on the switch 8 in the pressure direction 20, this valve is opened and the pressurized air which is in contact with the supply line 14 and originates from a supply container, not represented, of the vehicle reaches into the actuator line 15. The pressurized air from the pressurized-air line 14 can also originate from other pressurized-air sources, not necessarily from the vehicle supply. As soon as the switch 8 is released, the ram 13 moves, because of the spring 22, upwards again and closes the 3/2-way valve 16, with the result that pressurized air can no longer reach into the actuator line 15.

The other end of the actuator line 15, which thus is not in contact with the 3/2-way valve 16, is represented in FIG. 5. In the present case, there is a branching of the actuator line 15, with the result that the latter, in the area of the shoulder adjustment, loads two pneumatic actuator elements 10 with pressurized air, if pressurized air reaches into the actuator line 15 via the 3/2-way valve 16. Only one of the two pneumatic actuator elements 10, which are formed as pneumatic cylinders 17, is represented in FIG. 5, as the pneumatic cylinder 17 arranged on the right-hand side is screened by the side part of the backrest 2. However, the two pneumatic cylinders 17 are constructed substantially the same and act in the same way on the second locking device 7, wherein they are formed in each case on each of the two sides of the backrest 2.

In principle, the mode of operation of the pneumatic cylinders 17 is known to a person skilled in the art, with the result that this is discussed only briefly in the following. As long as the pneumatic cylinder 17 is not loaded with pressurized air from the actuator line 15, its piston rod remains retracted and the toothing of the catch 12 of the second locking device 7 is engaged. As soon as pressurized air flows via the actuator line 15 into the pneumatic cylinder 17, the piston rod is extended against a corresponding spring element, wherein the engagement between the rows of teeth of the catch 12 is disengaged. In this state, the backrest upper part 4 can be freely rotated with respect to the backrest base 3 about the pivot axis 5. The seat user can then set the angle between the backrest upper part 4 and the backrest base 3 that is optimum for his needs. As soon as this angle is achieved, he releases the switch 8.

As described above with regard to FIGS. 2 and 4, the ram 13 then moves upwards because of the elastic force, which leads to a blocking of the 3/2-way valve 16, and thus pressurized air is no longer allowed to reach into the actuator line 15. The piston rod of the pneumatic cylinder 17 is thereby retracted again because of the spring element and a positive locking of the rows of teeth of the catch 12 is achieved again. A rotation of the backrest upper part 4 with respect to the backrest base 3 about the pivot axis 5 is thereby prevented. A secure setting of the angle and also a catching of same are thereby guaranteed until the seat user operates the pneumatics again via the switch 8.

By means of the integrated switch 8 according to the invention for the pneumatic setting of the shoulder adjustment in the operating lever 6 for the mechanical adjustment of the backrest tilt, a very compactly built part, which can in addition also be operated extremely ergonomically, is provided for setting these two functions.

LIST OF REFERENCE NUMBERS 1 seat part
2 backrest
3 backrest base
4 backrest upper part
5 pivot axis
6 operating lever
7 second locking device
8 switch
9 pneumatic control element
10 pneumatic actuator element
11 rotational axis
12 catch
13 ram
14 supply line
15 actuator line
16 3/2-way valve
17 pneumatic cylinder
18 unlocking direction
19 operating flange
20 pressure direction
21 cover
22 spring

The invention claimed is:

1. A vehicle seat, comprising: a seat part and a backrest, wherein an angle formed between the seat part and the backrest can be set, wherein the backrest includes a backrest base facing the seat part and of a backrest upper part adjoining the backrest base, wherein the backrest upper part can be pivoted with respect to the backrest base about a substantially horizontally aligned pivot axis, wherein an angular position of the backrest upper part with respect to the backrest base can be set with respect to the seat part independently of the angular position of the backrest base with a first locking device, such that the tilt of the backrest base with respect to the seat part can be fixed in at least two positions, wherein there is an operating lever which operates the first locking device mechanically with a second locking device, such that the tilt of the backrest upper part with respect to the backrest base can be fixed in at least two positions, wherein there is a switch which operates the second locking device and, for this, is in active connection with a pneumatic control element and at least one pneumatic actuator element, wherein the switch is integrated in the operating lever.

2. The vehicle seat according to claim 1, wherein the switch is formed as a rocker rotatable with respect to the operating lever about a rotational axis.

3. The vehicle seat according to claim 1, wherein the at least one pneumatic actuator element is a single-acting pneumatic cylinder which is arranged on the backrest base.

4. The vehicle seat according to claim 3, wherein the pneumatic control element and the at least one pneumatic actuator element are supplied with pneumatic energy by an on-board air compressor or an electrically operated miniature compressor.

5. The vehicle seat according to claim 1, wherein the at least one pressurized pneumatic actuator element brings a respectively allocated catch, which is a constituent of the second locking device, into an unlocked position and, when the at least one pneumatic actuator element is depressurized, the respectively allocated catch is brought into a locked position in a spring-loaded manner.

6. The vehicle seat according to claim 1, wherein the adjustment range of the backrest upper part with respect to the backrest base is between zero and twenty degrees.

7. The vehicle seat according to claim 1, wherein the angular positioning of the backrest upper part with respect to the backrest base is incrementally adjustable between 1.5 degrees and 2.5 degrees.

8. The vehicle seat according to claim 1, wherein one catch each is arranged on each side of the backrest for fixing the angular position of the backrest upper part relative to the backrest base.

9. The vehicle seat according to claim 1, wherein if pneumatic auxiliary power is not available, the tilt of the backrest upper part with respect to the backrest base can be locked or unlocked by manual actuation.

10. The vehicle seat according to claim 1, wherein the pneumatic control element is designed as a 3/2-way valve.

11. The vehicle seat according to claim 1, wherein the adjustment range of the backrest upper part with respect to the backrest base is between 14 degrees and 20 degrees.

12. The vehicle seat according to claim 1, wherein the angular positioning of the backrest base with respect to the seat part is incrementally adjustable between 1.5 degrees and 2.5 degrees.

* * * * *